Feb. 5, 1924. Re. 15,754

F. T. TAYLOR

CONVEYING MECHANISM

Original Filed Jan. 30, 1919 6 Sheets-Sheet 1

Inventor
Floyd T. Taylor
By Edwin B. H. Tuck, Jr. Atty.

Feb. 5, 1924. Re. 15,754

F. T. TAYLOR

CONVEYING MECHANISM

Original Filed Jan. 30, 1919 6 Sheets-Sheet 2

Inventor
Floyd T. Taylor
By. Edwin B. H. Jones, Jr. Atty.

Feb. 5, 1924. Re. 15,754

F. T. TAYLOR

CONVEYING MECHANISM

Original Filed Jan. 30, 1919 6 Sheets-Sheet 3

Inventor:
Floyd T. Taylor.

By Edwin B. H. Jaeger Jr. Atty.

Feb. 5, 1924. Re. 15,754
F. T. TAYLOR
CONVEYING MECHANISM
Original Filed Jan. 30, 1919 6 Sheets-Sheet 4
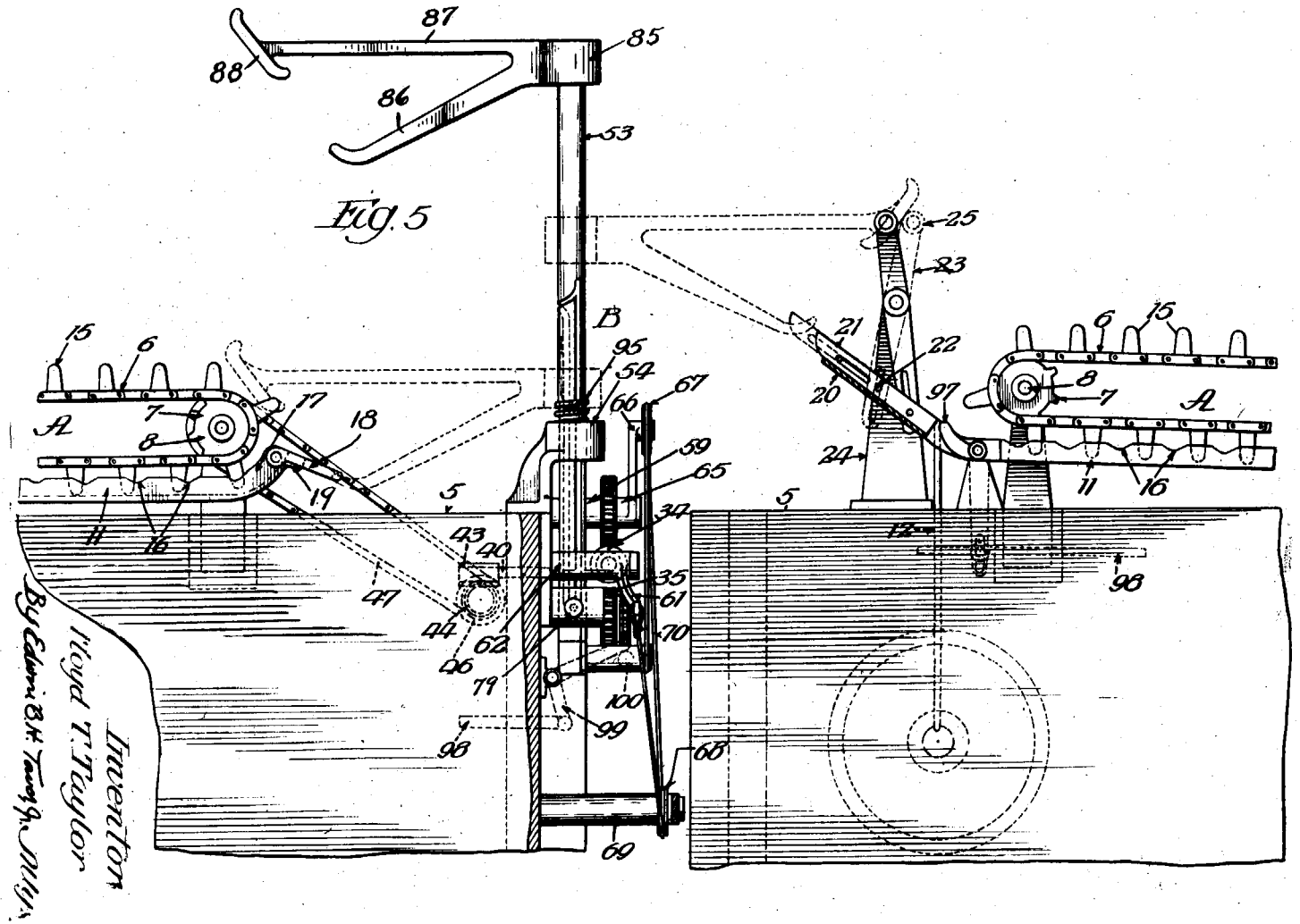

Feb. 5, 1924. Re. 15,754
F. T. TAYLOR
CONVEYING MECHANISM
Original Filed Jan. 30, 1919 6 Sheets-Sheet 5
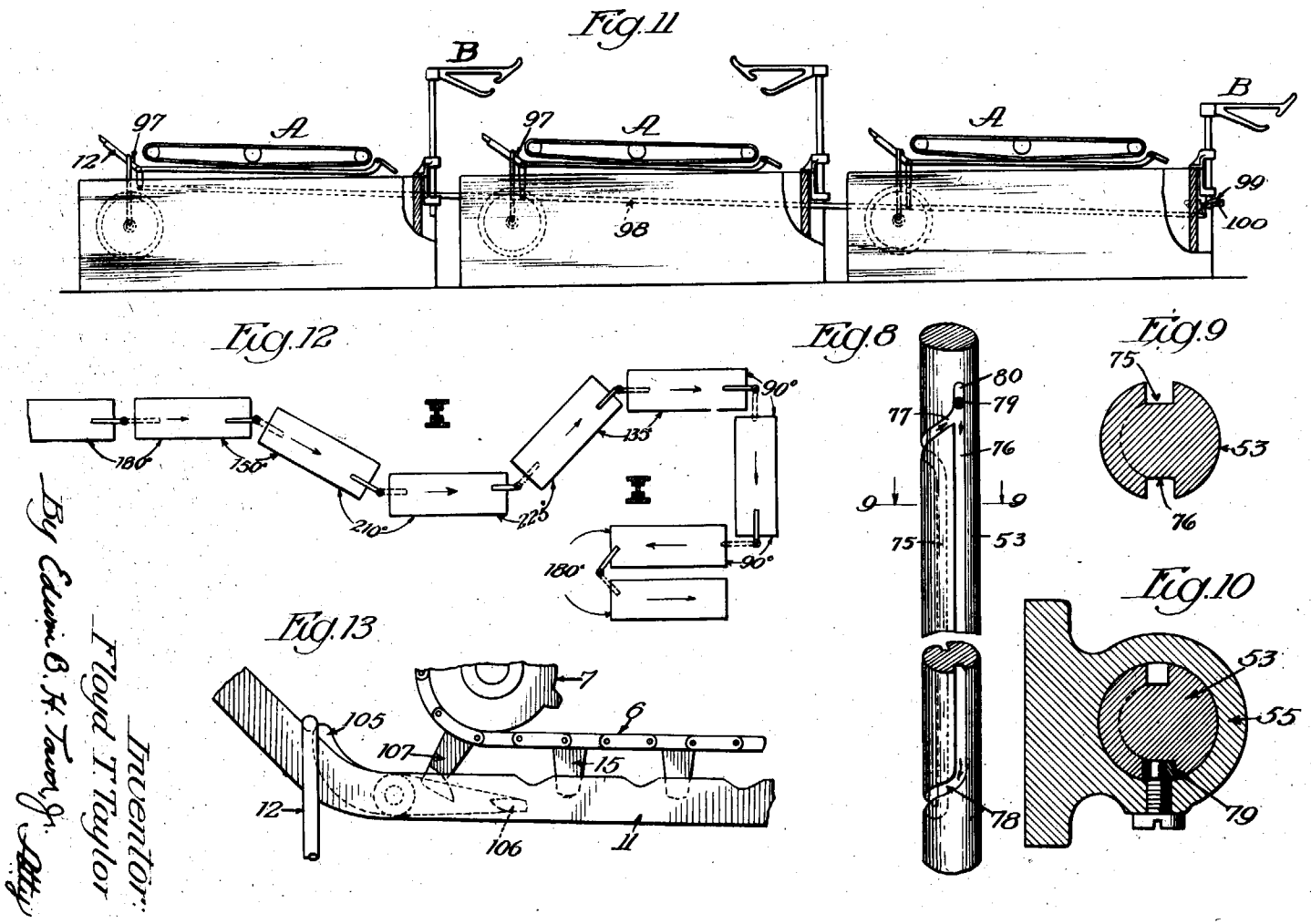
Inventor:
Floyd T. Taylor
By Edwin B. H. Taylor, Jr. Atty Feb. 5, 1924.

F. T. TAYLOR

Re. 15,754

CONVEYING MECHANISM

Original Filed Jan. 30, 1919 6 Sheets-Sheet 6

Inventor:
Floyd T. Taylor
By Edwin B. H. Jones, Jr. Atty.

Reissued Feb. 5, 1924. Re. 15,754

UNITED STATES PATENT OFFICE.

FLOYD T. TAYLOR, OF MATAWAN, NEW JERSEY, ASSIGNOR TO A. P. MUNNING & CO., OF NEWARK, NEW JERSEY, A CORPORATION OF NEW JERSEY.

CONVEYING MECHANISM.

Original No. 1,382,144, dated June 21, 1921, Serial No. 274,113, filed January 30, 1919. Application for reissue filed April 13, 1923. Serial No. 631,921.

*To all whom it may concern:*

Be it known that I, FLOYD T. TAYLOR, a citizen of the United States, residing at Matawan, in the county of Monmouth and State of New Jersey, have invented new and useful Improvements in Conveying Mechanism, of which the following is a specification.

This invention relates to conveying mechanism.

It is particularly adapted for the transportation of articles or material through a plurality of receptacles for different treatments, and for transferring the articles or material from one receptacle to the succeeding receptacle, although it may be advantageously employed in various other fields.

It is desirable in many industries, such for example as those of electro-plating, galvanizing, etc., to subject the articles or material to several successive treatments, which may require different periods of time to produce the best results. It is often advantageous, if not absolutely necessary, especially in large industrial plants, to carry the articles or material continuously forward during the progress of these various treatments. It is also desirable in many instances to produce agitation of the treatment ingredients to facilitate their action upon the articles or material treated. Considerable saving in expense and labor and a more regularly uniform product will also result if the transfer of material through the receptacles and from receptacle to receptacle can be accomplished by mechanism operating either wholly or in part automatically.

An object of this invention is to provide an improved conveying mechanism for automatically transporting articles or material.

Another object is to provide an improved conveying mechanism by which the articles or material may be transported by a plurality of conveyer sections and automatically transferred from section to section.

Another object is to provide conveying mechanism and transfer mechanism in which there is such co-operation between the elements that there is no congestion or crowding of the articles or material being transported.

Another object is to provide an improved conveying mechanism by which the material is automatically passed through treatment receptacles.

Another object is to provide improved mechanism for readily transferring the articles or material from one receptacle to another.

Another object is to provide mechanism for automatically carrying the material through substantially the entire length of one receptacle and then automatically transferring the material to another receptacle.

Another object is to provide mechanism for transferring material from one receptacle to another which permits the receptacles to be arranged in any desired relative position.

Another object is to provide sectional conveying mechanism in which the time of passage of material over any section and from section to section may be readily regulated.

Another object is to provide improved conveying mechanism for transferring articles from one receptacle to another and facilitating the draining of the articles.

Other objects and advantages of the invention will hereinafter appear:

The accompanying drawings illustrate an embodiment of the invention particularly adapted for the automatic conveying of material through a series of receptacles, such as tanks or vats and for transferring the material from one tank or vat to another. A single conveyer may be provided for several receptacles or the material may be transported through each receptacle by an independent conveyer section, the operation of which may be so timed that the period of transportation corresponds to the period of proper treatment. The material is then automatically delivered to transfer mechanism by which it is moved from one conveyer section to another. This transfer may be either automatically or manually controlled, as desired. The conveyer sections may all be arranged to pass the material through receptacles where it is subjected to different treatments, or one or more of the sections may be in the form of delivery mechanism for transporting the material to any desired location for packing, storage, etc. The receptacles may be arranged in any relative position to suit the particular accommodations available or to meet any special requirements as to the desired or necessary direction of transportation of the material undergoing industrial treatment.

Many modifications, within the scope of the invention will readily occur to those skilled in the art from the embodiment and adaptation illustrated herein.

The views of the drawings are:

Fig. 2 is a plan of the conveying mechanism showing two tanks or vats arranged in longitudinal alinement.

Fig. 5 is an enlarged side elevation showing the arrangement for two tanks in longitudinal alinement, the elevating mechanism being shown in both a depressed and an elevated position.

Fig. 6 is an enlarged end view partly in section of a conveyer section for transporting the material through a tank.

Figs. 7, 8, 9 and 10 are details of the transfer mechanism.

Fig. 11 is a side elevation showing the mechanism arranged to pass the material through a series of treatments.

Fig. 12 is a plan of an arrangement for successive treatments, illustrating how the mechanism can be adapted to meet special space conditions.

Fig. 13 shows a modified arrangement for starting the material in a conveyer section.

Figure 1:
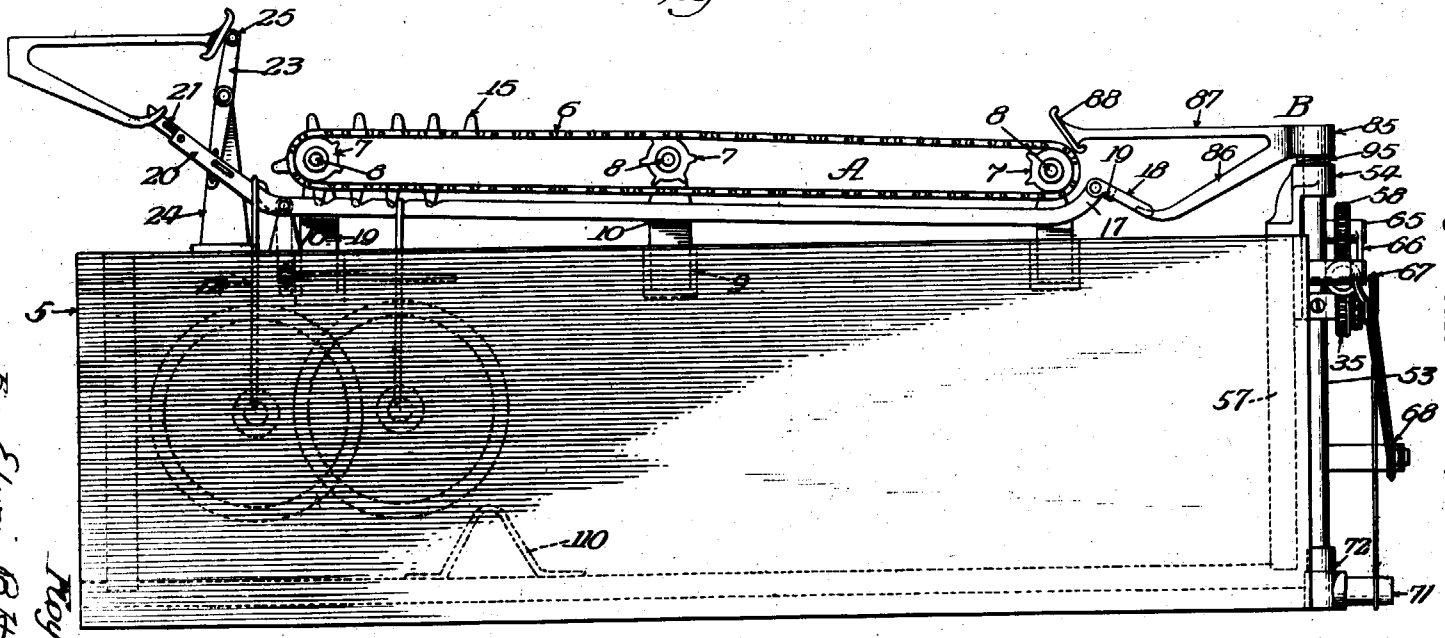
Fig. 1 is a side elevation of a conveyer section and transfer mechanism mounted upon a tank or vat.

The conveying mechanism comprises one or more conveyer sections A for transporting the material through the various treatment receptacles or tanks and transfer mechanisms B for transferring the material from one conveyer section to another. The conveyer sections may be arranged in any desired relative position to accommodate peculiarities in accommodations or service conditions, as will be hereinafter more fully explained.

*The conveyer sections.*—The conveyer sections for transporting the material to be treated through the various receptacles will first be described.

Each receptacle, as shown, is in the form of a tank or vat 5, in which the material is treated with the desired ingredients in solution. The material starts at one end of a tank and is continuously carried forward to the opposite end, thus facilitating the continuous passage of the material through the several treatments and aiding in the agitation of the solutions and the production of uniform and satisfactory results. The forward movement is produced by an endless conveyer belt or chain 6. The belt or chain 6 is supported at proper intervals by pulleys or sprocket wheels 7. These sprocket wheels or pulleys are carried by shafts 8 journaled in bearings in suitable mounting brackets 9. Brackets 9 are fastened to the sides of tank 5 and are provided with angle supports 10 upon which a track is mounted for supporting the material as it is carried forward. The track is in the form of a U-shaped channel 11, shown above and extending throughout the greater portion of the length of the tank midway between its sides.

The material to be treated may be carried by suitable racks 12, each of which is provided with a hanger having oppositely disposed hooks 13 and 14. One of these hooks extends over the top of channel 11, as most clearly shown in Fig. 6, allowing the rack 12 and the material carried thereby to be freely supported in the solution. The other hook is adapted to be engaged by the transfer mechanism when the material is to be transferred from one conveyer section to another. One hook only may be used but two hooks, one for suspension on the track and one for co-operation with the transfer mechanism, are preferred as there is less likelihood of conflict and uncertainty of operation. The chain or belt 6 has a number of projecting lugs 15 adapted to extend into channel 11 to engage the hooks on the racks to slide the racks and material along the track when the belt or chain is in motion. The top of track 11 is provided with notches 16, so that, as the racks are pushed along they are also caused to move up and down to increase the agitation of the solution.

In order to facilitate the delivery of the material from a conveyer section to the transfer mechanism, the rear end of track 11 is given an upward curve 17, to the upper end of which a downwardly extending track extension 18 is pivoted. Extension 18 normally rests in a depressed position against a stop 19, but may be slightly turned, when the racks of material are being removed therefrom, to insure that the racks will be readily disengaged from the track. The delivery of the material from the transfer mechanism to a conveyer section is assisted by providing an upwardly inclined extension 20 of track 11 at the receiving end of the section. The outer end of extension 20 is provided with an extensible track section 21, which is connected by a pin-and-slot 22 to a lever 23. Lever 23 is pivoted to a suitable bracket 24 mounted on the tank and is provided at its upper end with a roller 25 to be engaged by a part of the transfer mechanism to project the extension 21 into the path of one of the rack hooks, as will be hereinafter explained.

Movement is imparted to the belt from any suitable source of power through a friction belt pulley 30. Pulley 30 is carried by a journaled bracket 31 supported upon tank 5 near the end thereof. The shaft of pulley 30 has a universal joint 32, which supports one end of a short shaft 33. Shaft 33 has a worm 34 adapted to normally engage a worm wheel 35 carried by a fixed shaft 36. Worm wheel 35 carries a sprocket wheel 37 around which passes a chain 38. Chain 38 drives a sprocket wheel 39, which is carried by a shaft 40 journaled in brackets 41 and 42 mounted upon tank 5. Shaft 40 has a worm 43, which engages a worm wheel 44 carried by a shaft 45, to which a sprocket wheel 46 is secured. Sprocket wheel 46 drives a chain 47, which also passes over a sprocket wheel 48 carried by one of the shafts 8. A hand nut 49 controls the action of clutch member 50 internally engaging belt pulley 30. Rotation of pulley 30, when worm 34 and wheel 35 are in engagement, causes forward movement of belt 6 and the racks and material moved thereby, and thus the material is continuously advanced through the solution in the treatment tank 5.

Buckets or other suitable containers having the necessary hooks or loops for embracing the channel 11 may be employed instead of carrying the material on racks, and if the articles themselves are provided with suitably projecting hooks, loops or other means for suspension from the channel 11 no supporting carriers or containers are necessary. The lugs or projections 15 may be so spaced that the material on the racks or other carriers will not interfere with each other during their passage through a tank. The speed of the belt 6 may be so timed, by the selection of proper worms and gears, that the time required to pass the material through a tank will correspond to the period of time during which the particular treatment should continue. If the treatment requires the passage of an electric current through the material and the solution the channel 11 may be used as one of the electrodes, the other being suitably placed in the tank.

*The transfer mechanism.*—The transfer mechanism B, whereby the material is moved from tank to tank, will next be described.

This apparatus comprises an elevating and lowering plunger 53 slidably and rotatably guided in collars 54 and 55 and a guideway 56. The collars and guideway form part of a bracket 57 mounted upon the tank 5. The plunger 53 is shown as being operated from the same source of power that drives the conveying belt 6. A universal joint 32 allows shaft 33 to be elevated to cause worm 34 to engage a worm wheel 58 mounted on a fixed shaft 59. Shaft 59 is journaled in bearings supported by bracket 57. To elevate worm 34 the end of shaft 33 is supported by a pivoted end-bearing 60 carried by a bell-crank lever 61. Bell-crank lever 61 is pivoted to an extending lug 62 of bracket 57. Worm wheel 58 has a collar 65 provided with an arm 66 upon which is journaled a belt pulley 67. A second belt pulley 68 is journaled to an extension 69 of bracket 57. A belt 70 has one end anchored to the outer end of lever 61 and passes over pulleys 67 and 68, its other end being fastened to a suitable projection 71, extending from a plunger support 72. The lower end of elevating plunger 53 rests in a suitable socket in support 72 in which it is free to rotate. Support 72 has a pair of guide keys 73, which travel in the grooves of guideway 56 to prevent the support from rotating.

It will thus be apparent that if worm wheel 58 is driven by worm 34, the arm 66 will rotate, carrying with it pulley 67. This movement of pulley 67 will, since one end of belt 70 is anchored to lever 61 and the other end is fastened to the movable plunger support 72, raise plunger 53 a distance approximately equal to the diameter of the circle described by the outer belt surface of pulley 67. The end of the belt fastened to lever 61 has only a very limited movement, because, when the worm 34 and worm wheel 58 engage, further rotation of lever 61 is prevented.

Figures 2, 6, 7:
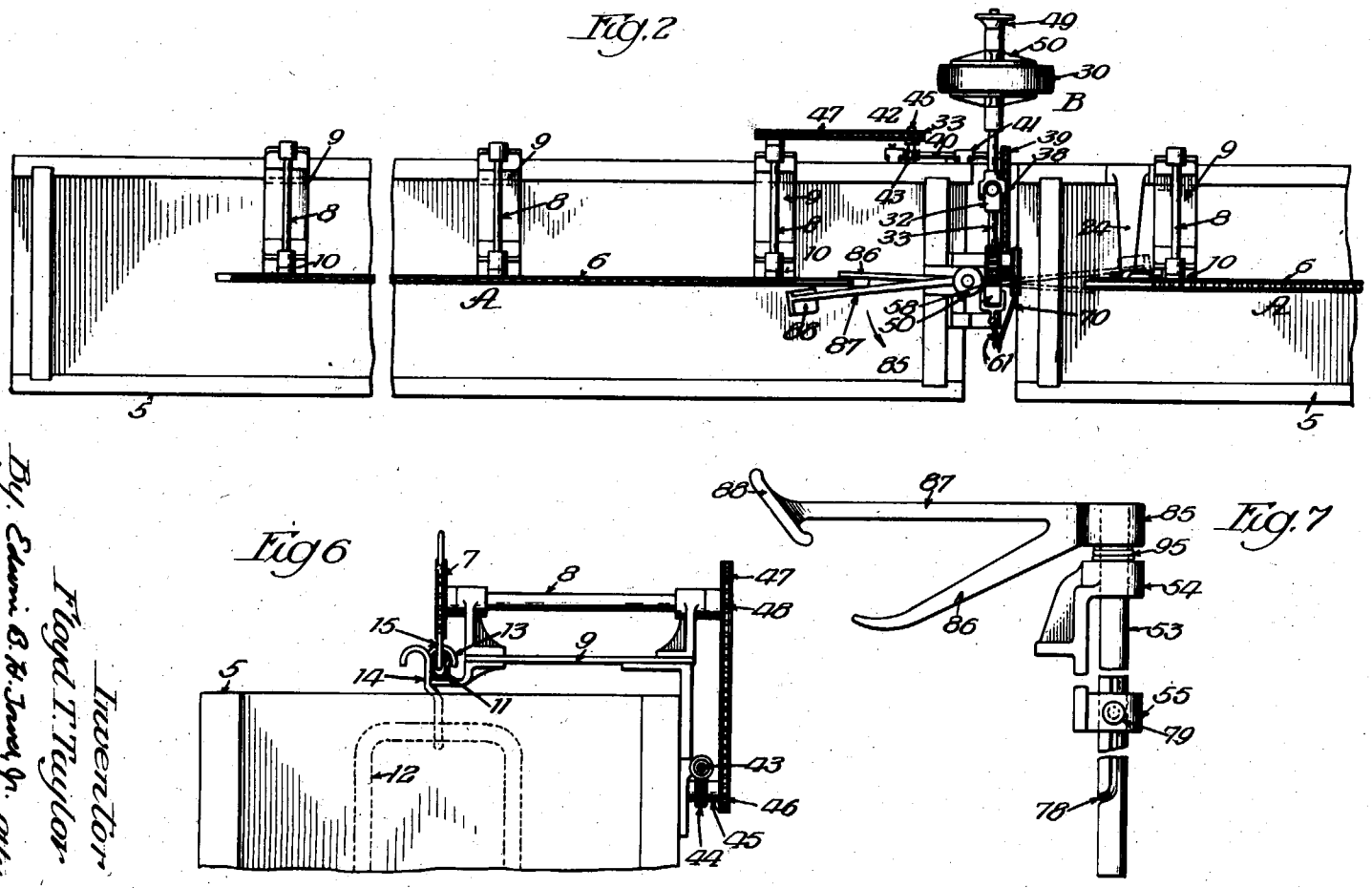
Figures 3, 4:
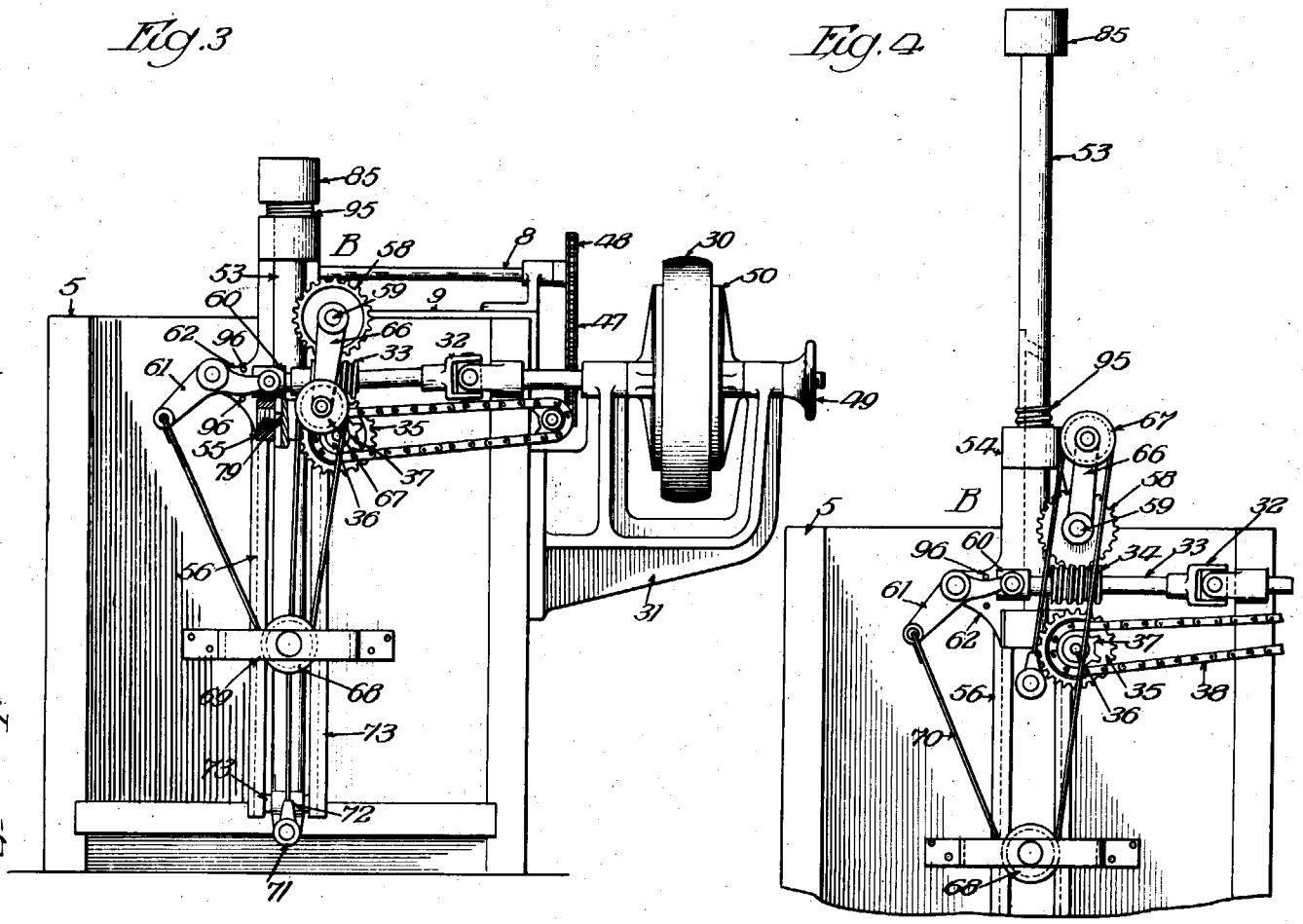
Fig. 3 is an enlarged end elevation of the mechanism for transferring the material from tank to tank, the lifting apparatus being shown in its normal position.
Fig. 4 is an enlarged end elevation of the transfer mechanism, the lifting apparatus being shown in its elevated position.

Means are provided to rotate plunger 53, in an anti-clockwise direction, as shown in Fig. 2, to any desired position in order to move the material to the next tank after it has been raised. The plunger is then lowered, delivering its load to the next conveyer section, and is finally rotated back to its initial position, ready to receive a new load. These movements are accomplished by providing plunger 53 throughout a portion of its length with a double groove having two vertical portions 75 and 76, interconnected at the top and bottom respectively by two spiral portions 77 and 78. A key 79 carried by collar 55 of the bracket 57 extends into this groove. As long as the groove is straight and longitudinal of plunger 53, the rotation of arm 66 and pulley 67 merely elevates or lowers the plunger. The interconnecting spiral portions, however, permit any desired amount of rotation to be imparted to the plunger. In the embodiment illustrated in detail, the transfer of material is between two tanks in longitudinal alinement and the plunger must therefore be turned anti-clockwise 180 degrees and then back the same amount. This is accomplished by cutting each of the interconnecting spiraled groove sections 77 and 78 around half of the circumference of plunger 53, as clearly shown in Figs. 8, 9 and 10. The upper end of the vertical portion 76 is extended slightly above the intersection of the interconnecting portion 77, as shown at 80 in Fig. 8. In the normal or depressed position of plunger 53, key 79 lies nearly at the end of extension 80. If arm 66 and pulley 67 are rotated with the mechanism in its initial position, plunger 53 is first elevated, since key 79 remains in the vertical portions 80 and 76 of the groove. Then, as the lower spiral portion 78 of the groove reaches key 79, the plunger is given a combined anti-clockwise rotary and slightly upward movement, reaching the position shown by the dotted lines in Fig. 2. These movements of plunger 53 take place while the arm 66 is executing the upward portion of its travel. As the arm 66 begins to descend in its arc of movement, due to the continued rotation of gear wheel 58, the distance between pulleys 67 and 68 is gradually reduced and plunger 53 descends in its turned position, because key 79 is now in the vertical portion 75 of the groove. The plunger continues to descend until the spiral portion 77 thereof reaches key 79, whereupon the plunger is moved back to its initial position by a combined clockwise rotary and downward movement. Just before the pulley 67 reaches its lower position and when key 79 is almost at the end of groove extension 80, the downward movement of the plunger 53 is arrested, as will be hereinafter explained. This allows belt 70 to slacken, and the weight of shaft 33 and worm 34 causes the outer end of the shaft to fall until it is arrested by worm 34 re-engaging worm wheel 35. The power is thus removed from gear 58, its rotation ceases, and the transfer mechanism is again brought to rest in position to receive the next rack of material.

The means employed to reciprocate and rotate the plunger are in operative engagement during a complete cycle of movement of the latter. In the embodiment of the invention shown in the drawings, a cycle of movement of the plunger would comprise an elevation, a combined anti-clockwise rotation and slightly upward movement, a downward movement and finally a combined clockwise rotation and downward movement.

Plunger 53 is equipped at its top with a collar 85, carrying an arm 86 for picking up the racks of material by their hooks and transferring them from one conveyer section to the next during the upward, rotary and downward movements of the plunger. Collar 85 is also provided with an arm 87, which has a shoe 88, adapted to engage the roller 25 of lever 23 when plunger 53 has moved downward a predetermined distance in its turned position.

This engagement tilts lever 23 and causes it to move the track extension 21 outwardly, as shown by the dotted lines of Fig. 5. In this position extension 21 is in the path of that rack hook which is now hanging on transfer arm 86. The rack is removed from the transfer mechanism and moves down the inclined portion of the track of the next conveyer section by the force of gravity.

When the transfer from tank to tank is to be completely automatic, a counter-balance device, such as a spring 95, placed around plunger 53 above collar 54, is employed. This spring is of such a length and strength that when plunger 53 descends, collar 85 thereon engages the spring and the descent is arrested just before pulley 67 reaches its lower position. The continued rotation of pulley 67 slackens belt 70 to such an extent that the worm 34 and gear 58 are disengaged and the elevating mechanism brought to rest, as hereinbefore described. When, however, the next rack of material is delivered by belt 6, the additional weight further slightly depresses plunger 53 against the tension of spring 95. This movement is sufficient to tension belt 70 and rock lever 61 to cause re-engagement of worm 34 and gear 58. Thereafter sufficient tension is maintained in belt 70 to keep worm 34 and gear 58 in mesh during the rotation of arm 66 and pulley 67 and the movements of plunger 53 until the plunger is arrested by spring 95. The cycle of operations is thus automatically repeated each time a new rack of material is delivered to the arm 86. The operation of the elevating mechanism is, therefore, timed to take place between the arrivals of material thereto. It will also be noted that when the operation of the elevating mechanism begins, by the rocking of lever 61, to cause the engagement of worm 34 and gear 58, the engagement of worm 34 and gear 35 is broken. The conveyer section is, therefore, stopped when the succeeding transfer mechanism is performing its function. Thus, a rack of material will not be delivered to the delivery end of a conveyer section until the arm of the transfer mechanism is there to receive it.

In case the weight of the material is insufficient to depress the plunger 53, against the tension of spring 95, the necessary weight may be added to the racks, or the racks may be made heavy enough to require no additional weight to cause them to start the elevating mechanism in operation. The operation of the elevating mechanism is thus automatically synchronized with the operation of the conveyer, and since it operates only when material is delivered thereto, it does not consume unnecessary power by useless movements.

If the operation of the transfer mechanism is to be semi-automatic, the downward movement of plunger 53 is positively stopped by so relating collars 54 and 85 that they engage just before pulley 67 reaches its lower position. The spring 95 may then be dispensed with. Thus, when collars 54 and 85 engage, the mechanism is stopped in its normal receiving position, as previously described, but the weight of a rack of material cannot further depress the plunger, and the worm 34 and gear wheel 58 are not thrown into mesh to cause the rack to be automatically transferred. The transfer operation is then started by manually depressing the outer end of lever 61, either directly or by pulling belt 70. The lever 61 is thus rocked and worm 34 and gear wheel 58 thrown into mesh. The tension immediately put upon belt 70 by the rotation of arm 66 and pulley 67 prevents the worm and gear from separating. Worm 34 and worm wheel 35 are also thrown out of mesh, as before, and the conveyer stops. The material is elevated, moved around to the proper position for the next tank, delivered to the conveyer of that tank, and the transfer mechanism returned to its normal position, where it remains until the lever 61 is again manually rocked.

If desired, the elevating mechanism can be made entirely manual in its operation by securing lever 61 in its normal or inoperative position by removable stops 96. A crank may then be mounted on shaft 59 and the elevating mechanism will operate only when and so long as the crank is turned. Of course, the entire conveying mechanism may be hand operated by replacing the power pulley 30 by a suitable crank.

*Summary of operation.*—To summarize briefly, the operation of the conveying mechanism is as follows:

The material is transported, in spaced relation, through one receptacle by the endless conveyer 6 and is delivered at intervals thereby to the arm 86 of the transfer mechanism. The added weight of the material slightly depresses plunger 53, tensioning belt 70 to move lever 61. The rocking of lever 61 causes the disengagement of rotating worm 34 and worm wheel 35, stopping the belt 6. It also causes the engagement of worm 34 and worm wheel 58, by which pulley 67 is carried in the arc of a circle about shaft 59. This rotation of pulley 67 first raises plunger 53, which, because of the interengagement of the plunger groove and key 79 rotates at the proper time to position arm 86 over the next conveyer. The further rotation of pulley 67 causes plunger 53 and arm 86 to be lowered part way, where the material is removed from the transfer arm through the action of lever 87 rocking lever 23 to project track extension 21 into the path of one of the material rack hooks. The lowering of the plunger continues, and when the upper spiral groove section reaches key 79 the plunger and arm are rotated back to initial position. Movement of the plunger then ceases until the arrival of the next rack of material to the arm, whereupon the operation is repeated.

A pivoted trip 97 may be extended within the channeled track 11 in order to time the starting of the material through any tank or synchronize all of the conveyer sections with one of the transfer mechanisms. The racks descending the track extension 21 are held by this trip until released by one of the transfer plungers. This release is accomplished by a trip rod 98, which is connected at one end to trip 97 and at the other end to a bell crank lever 99. An arm of bell crank lever 99 is in a position to be engaged by some part associated with the elevating mechanism, such as a stud 100 projecting from the extension 71 of plunger support 72. When the plunger has nearly reached the upper limit of its travel, stud 100 engages bell-crank lever 99, and the trip 97 is operated through trip rod 98 to release a rack of material. With this arrangement, any elevating mechanism may control the starting of the material in any tank or in any number of tanks. In Fig. 11 the last elevating mechanism is shown controlling the trips of the three preceding conveyer sections.

Instead of having the release of the material to a conveyer controlled by one of the transfer mechanisms, a conveyer section itself may release the racks at the desired intervals. Fig. 13 shows how this may be accomplished. A pivoted trip 105 projecting into the channeled track engages the racks and stops them. Trip 105 has a cam 106 for engagement by lugs 107 carried by the conveyer chain 6. These lugs may be positioned along the chain as desired and when they ride over cam 106 the trip lever is rocked to release the rack which it may be holding.

Figure 15:
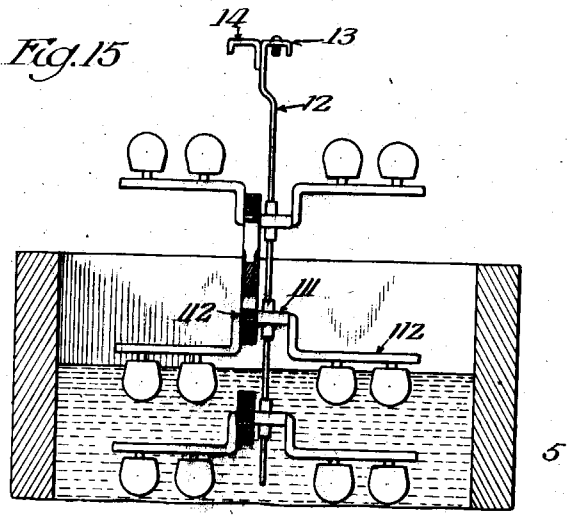
Figs. 14, 15 and 16 show mechanism for facilitating the draining of the articles or material.
Figure 16:
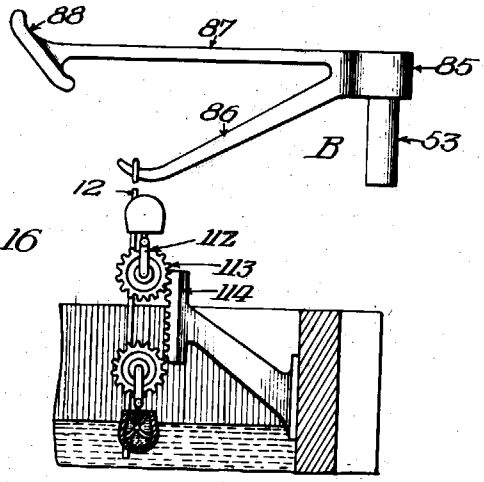
Figure 14:
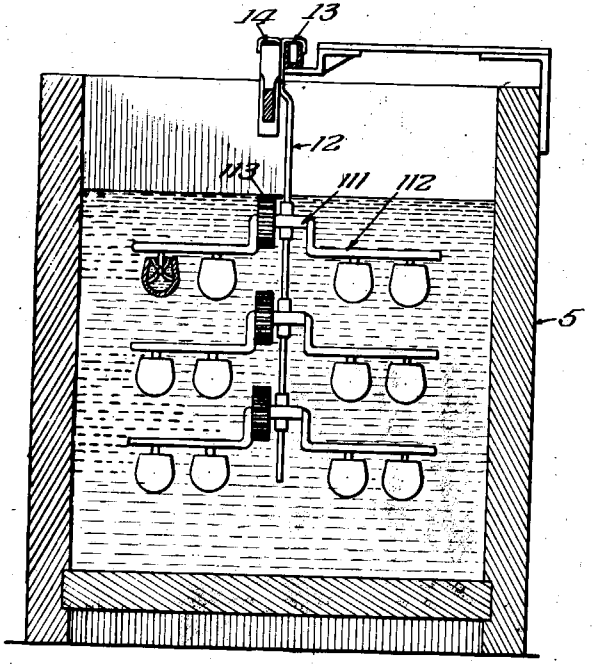

Suitable projections 110 may be placed in the tanks to strike the material and cause it to be slightly moved upon the suspending racks in order to insure the entire surface of the material being treated. Thus no portion of the surface of the material will be continuously covered by the supporting portion of a rack during a treatment.

Where hollow articles are to be treated by solutions, it is often desirable to suspend them from a rack through apertures in their surfaces. When raised from the solutions, the hollow bodies are, therefore, full of the treatment solution, which often should not be carried over into the next tank. Means may be provided to turn such articles bottom side up as they are being transferred to facilitate the draining thereof. Figs. 14 to 16 illustrate one way in which this turning may be accomplished. The racks are provided with bearings 111 in which material suspending shafts 112 are rotatably supported. These shafts are each provided with a pinion 113 positioned to engage a stationary rack 114 mounted on the end of a tank. The articles are suspended in the solution with their apertures up, as shown in Fig. 14. As plunger 53 and arm 86 of the transfer mechanism are elevated, pinion 113 engages rack 114. The shaft 112 is thereupon rotated as the ascent continues and the articles are turned upside down, as shown at the top of Figs. 15 and 16.

A conveying mechanism such as hereinbefore described will be found especially useful in such industrial processes as electroplating, where the material is usually successively subjected to treatment of acid solutions for removing oxides, alkaline solutions to neutralize the acids or remove grease, and plating solutions to provide the desired coatings. With this apparatus the treatments may be automatically, and thus systematically, carried on with minimum waste and expenditure of time and labor. The material passing continuously through the treatment solutions agitates the solutions and thus insures more uniform results in a minimum of time. The conveyers may be operated slowly while the transfer mechanism may be so geared that the material is transferred very rapidly from receptacle to receptacle so as not to expose the material unduly to the air during treatment. On the other hand, should the occasion require, the material may be passed rapidly through some receptacles and slowly through others and slowly or rapidly transferred between receptacles, as desired. The conveyers and transfer mechanisms are all independent so far as speed is concerned, being readily regulated by the choice of gears.

While the receptacles chosen to illustrate the features of the mechanism are open tanks or vats particularly adapted for treatments by liquids, it will be readily understood that the receptacles may be either wholly or partly inclosed for treatment by gases or vapors. Any desired amount of rotation may be imparted to the material in its transfer from receptacle to receptacle by the proper spiraling of the groove in the elevating plunger, so that the receptacles may be placed at any desired angle to each other. Thus, in the embodiment illustrated in detail, where the receptacles are in longitudinal alinement, the spiraled portions of the groove are extended around half of the circumference of the plunger. If it is desired to place the receptacles at right angles to each other, the groove will be spiraled at each end around a quarter of the circumference of the plunger. The receptacles may be arranged so that the material will take any desired path in undergoing its successive treatments and the available space may be utilized to the best advantage by the proper choice of spiraling of the plunger grooves in the transfer mechanism. Fig. 12 gives a plan of a lay-out to carry material in one general direction and subject it to nine successive treatments. The directions of the travel of the material are indicated by the arrows and the angle of rotation of each of the transfer plungers is given.

The last conveyer, instead of passing the material through a treatment receptacle, may convey it to a loading platform, packing bench or storage space, thus reducing the amount of handling required.

Of course, it will be readily understood that parts which have been shown as mounted upon or supported by the receptacles may be mounted independently thereof if desired and that many modifications may be made in the structure and arrangement illustrated without departing from the spirit of the invention.

What I claim is:

1. A conveying mechanism having a plurality of independently movable conveyers adapted to transport material in different receptacles, and mechanism operable independently for intermittently transferring the material from one conveyer to another.

2. A conveying mechanism having a plurality of independently movable conveyer sections each adapted to transport material in a different receptacle, and transfer mechanism operable independently for intermittently shifting the material from one conveyer section to another, arranged between the delivery and receiving ends of the adjacent conveyers.

3. In a conveying mechanism the combination of a plurality of independently movable conveyer sections movable in a horizontal plane and adapted to transport material in different receptacles, transfer mechanism for shifting the material from one conveyer section to another at a speed which may differ from that of the conveyer sections, and means co-operating with the transfer mechanism controlling the movement of one of said sections.

4. A conveying mechanism having a plurality of independent endless horizontal conveyers for transporting material in any desired relative direction, transfer mechanism adapted to remove the material from one conveyer and transfer the same to another conveyer at a predetermined angle to the first, and means co-operating with the transfer mechanism for stopping one of said conveyers during the transfer of the material.

5. In a conveying mechanism the combination with a plurality of independently movable conveyer sections for transporting material, of mechanism for transferring the material from one conveyer section to another at any predetermined speed, and means co-operating with the transfer mechanism controlling the movement of one of said sections whereby the conveyer sections and transfer mechanism are alternately actuated.

6. A conveying mechanism having a plurality of independently movable conveyer sections for transporting material through a series of treatments, and vertically movable transfer mechanism for removing the material from one conveyer section and delivering it to another conveyer at any predetermined angle to the first and at any predetermined speed.

7. A conveying mechanism for moving material comprising a series of independently movable conveyers adapted to be disposed in different angular relations, a transfer mechanism between the ends of adjacent conveyers for moving the material from one conveyer to another, and a common drive member for alternately driving the conveyer and the transfer mechanisms.

8. A conveying mechanism for moving material comprising a conveyer section, transfer mechanism for removing the material from said section, a drive member for said section and transfer mechanism, and means for successively establishing a driving connection therewith, so that the conveyer section is stationary when the transfer mechanism is functioning.

9. A conveying mechanism having a conveyer for moving material, a track for supporting the material during such movement, and transfer mechanism normally stationary for removing the material from said track, said transfer mechanism functioning automatically upon arrival of material thereto.

10. A conveying mechanism for subjecting material to a series of treatments having a plurality of independently movable conveyer sections for transporting the material through the various treatments, and transfer mechanism for removing the material from the conveyer section for one treatment and delivering the material to the conveyer section for another treatment automatically upon the arrival of material to be transferred, said conveyer and transfer mechanism being alternately driven by a common member.

11. A conveyer mechanism having a plurality of spaced independently movable conveyer sections for transporting material, and transfer mechanism between sections for moving the material at any predetermined angle from one conveyer section to another and automatically brought into action by the material.

12. In a conveyer mechanism the combination with a plurality of independently movable conveyer sections for transporting materials, of mechanism for transferring the material from one conveyer section to another, said mechanism having a plunger carrier for moving the material from section to section, and means automatically controlled by the material for controlling said carrier and one of said conveyer sections.

13. In a conveying mechanism the combination of a plurality of independently movable conveyer sections adapted to transport material, and transfer mechanism normally stationary for removing material from one conveyer section and lifting, rotating and delivering the material to another conveyer section, said conveyer and transfer mechanism being actuated successively by a common driving member.

14. A conveyer mechanism having a plurality of independently movable conveyer sections for transporting material, transfer means normally stationary for receiving the material from one section, and mechanism for operating said means to transfer material from one section to another, and then return to normal receiving position relative to the first section.

15. A conveyer mechanism having a plurality of conveyer sections for transporting material, a plunger, an arm carried thereby for carrying the material from one section, and means automatically controlled by the material for operating said plunger to transfer the material to another section, and to control the movement of one of said sections.

16. In a conveying mechanism, a plunger, means carried by the said plunger and adapted to transfer material from one position to another, and means adapted to elevate and rotate the said plunger at the same time, the said elevating and rotating means being in operative engagement during a complete cycle of movement of the said plunger.

17. In a conveying mechanism, a plunger provided with a groove, means carried by the said plunger and adapted to transfer material from one position to another, means adapted to elevate the said plunger, and means adapted to engage the said groove and rotate the said plunger, the said elevating means being in operative engagement during a complete cycle of movement of the said plunger.

18. In a conveying mechanism, a conveyer, transfer mechanism adapted to remove material from the said conveyer, means adapted to operate either the said conveyer or the said transfer mechanism, and means adapted to selectively place the said operating means into operative engagement with the said conveyer and the said transfer mechanism.

19. In a conveying mechanism, a plunger, means carried by the said plunger and adapted to transfer material from one position to another, and means adapted to engage the said plunger to elevate and rotate the latter at the same time, the said elevating and rotating means being in operative engagement during a complete cycle of movement of the said plunger.

20. In a conveying mechanism, a plunger, means carried by the said plunger and adapted to transfer material from one position to another, means adapted to reciprocate the said plunger, and means adapted to rotate the said plunger a predetermined amount during the reciprocation of the said plunger, the said reciprocating means being in operative engagement during a complete cycle of movement of the said plunger.

21. In a conveying mechanism, a plunger provided with a groove, means carried by the said plunger and adapted to transfer material from one position to another, means adapted to reciprocate the said plunger, and means adapted to engage the said groove and rotate the said plunger a predetermined amount during the reciprocation of the said plunger, the said reciprocating means being in operative engagement during a complete cycle of movement of the said plunger.

22. A conveying mechanism comprising a conveyer section, transfer mechanism for removing material from said section, a source of power common to said section and said mechanism, and means under the control of said mechanism for alternately connecting said source to said section and said mechanism so that both are not in operation at the same time.

23. A conveying mechanism comprising a conveyer section for transporting material, transfer mechanism for removing the material from said section, a source of power, and means automatically brought into action by the arrival of material to said mechanism for connecting said source to said mechanism for removing the material and disconnecting said source from said section to prevent the delivery of material to said mechanism while the same is in operation.

24. A conveying mechanism comprising a plurality of independently movable conveyer sections for transporting material, transfer mechanism between each pair of sections to transfer the material from one section to another, and means associated with the transfer mechanism for controlling the operation of any section.

25. A conveying mechanism comprising a conveyer section for transporting material, transfer mechanism associated with said section for removing the material therefrom, and means associated with said mechanism for tilting the material to facilitate the draining thereof.

26. In a conveying mechanism the combination with a plurality of independently movable conveyer sections adapted to transport material, of transfer mechanism having an arm for carrying the material from one section to another, an elevating plunger associated with and adapted to move said arm, mechanism operatively associated with said plunger for raising and lowering said arm, means associated with said plunger for rotating said arm through a predetermined angle during the raising of said plunger, and means for automatically starting and stopping said mechanism and one of the conveyer sections in accordance with the delivery of material to said arm.

27. An electro-plating apparatus comprising a work holder for articles to be plated, conveying mechanism for moving the said work holder along a tank, and reciprocating means adapted to engage the said work holder at the delivery end of the said tank and to disconnect the said work holder from the said conveying mechanism and to raise it substantially vertically above the said tank and to advance it toward and to lower it into an adjacent tank, the said work holder being adapted to drop from the delivery end of the said conveyor into engagement with the said reciprocating means.

28. An electro-plating apparatus comprising a work holder for articles to be plated, a conveying mechanism to move the work holder along a tank, a member for engaging the work holder at the delivery end of the tank to raise the same and then lower it outside the tank, the said work holder being adapted to drop from the delivery end of the said conveyer into engagement with the said member, and reciprocatory means for supporting and impelling said member.

29. In a conveying apparatus, a conveyer adapted to carry an article, a member adapted to engage the said article at the delivery end of the said conveyer and to elevate the said article, and means adapted to actuate the said member, the said article being adapted to drop from the delivery end of the said conveyer into engagement with the said member and to cause the said actuating means to function.

30. A conveyer having a work holder to carry material from one position to another, a reciprocating member for engagement with the work holder to elevate the same, the said work holder being adapted to drop into engagement with the said member, operating mechanism for said member, and means for causing rotation of said member during the reciprocatory movement thereof.

31. An electro-plating apparatus comprising a work holder for articles to be plated, a conveying mechanism to move the work holder along a tank, and a reciprocating member for engaging the work holder at the delivery end of the tank to raise the same, advance it and then lower it outside the tank, the said work holder being adapted to drop from the delivery end of the said conveying mechanism into engagement with the said member.

32. An electro-plating apparatus comprising a work holder for articles to be plated, a conveying mechanism to move the work holder along a tank, a member for engaging the work holder at the delivery end of the tank to raise the same and then lower it outside the tank, and means connected to the member adapted to be rotated and reciprocated at the same time through a predetermined path.

33. In a conveying mechanism for transporting material through a plurality of tanks, means for transferring the material from one tank to an adjacent tank comprising a member to engage the material or holder therefor, the said material or holder therefor being adapted to drop into engagement with the said member, and means including a longitudinally movable member for elevating, advancing and then lowering the first mentioned member.

34. A conveying mechanism for transferring material from one position to another comprising a member to engage the material or holder therefor, means including a reciprocating member for elevating, advancing and then lowering the first mentioned member, the said material or holder therefor being adapted to drop into engagement with the said member, and a guide for determining the path through which said reciprocating member is moved.

35. In a conveying apparatus, a conveyer, a work holder provided with a pair of hooks, and transfer mechanism for removing the said work holder from the delivery end of the said conveyer, the said conveyer being adapted to engage one of the said hooks and to drop the said work holder into engagement with the said transfer mechanism through the other of the said hooks.

In witness whereof, I have hereunto subscribed my name.

FLOYD T. TAYLOR.